United States Patent [19]

Light

[11] Patent Number: 5,774,888
[45] Date of Patent: Jun. 30, 1998

[54] METHOD FOR CHARACTERIZING A DOCUMENT SET USING EVALUATION SURROGATES

[75] Inventor: John Light, Hillsboro, Oreg.

[73] Assignee: Intel Corporation, Santa Clara, Calif.

[21] Appl. No.: 778,212

[22] Filed: Dec. 30, 1996

[51] Int. Cl.$^6$ ...................................................... G06F 17/30
[52] U.S. Cl. ........................................ 707/5; 707/1; 707/3
[58] Field of Search ................................ 707/1, 3, 5, 513

[56] References Cited

U.S. PATENT DOCUMENTS 5,418,951  5/1995  Damashek .................................... 707/5
5,442,778  8/1995  Petersen et al. ............................. 707/5

OTHER PUBLICATIONS

K.L. Kwok, "Experiments with a Component Theory of Probabistic Information Retrieval Based on Single Terms as Document Components," ACM Transactions on Information Systems, vol. 8 No. 4, Oct. 1990, pp. 363–386, Oct. 1990.
Udi Manber & Sun Wu, "Glimpse: A Tool to Search Through Entire File Systems," Oct., 1993, pp. 1–10.
Salton, Automatic Text Processing, Ch. 8–10, 1989, Addison–Wesley, pp. 229–371.
Salton/Mc Gill, "Introduction To Modern Information Retieval," Ch. 3–6, 1983, McGraw–Hill, pp. 53–256.

*Primary Examiner*—Paul V. Kulik
*Attorney, Agent, or Firm*—Leo V. Novakoski

[57] ABSTRACT

A method is provided for determining the relevance of a document to one or more topics, each of which is specified by a topic profile. The document is tokenized into a stream of document tokens and compound terms specified in the topic profiles are identified among the document tokens. The stream of document tokens is augmented for each identified compound term with a tagged compound term token specified in the topic profile. The augmented stream of document tokens is stopped to eliminate tokens representing common terms, redundant terms, and selected terms associated with tagged tokens. A similarity function is calculated between the resulting document representation and each of the topic profiles to provide an evaluation surrogate that includes measures of relevance the document to each of the topic profiles.

12 Claims, 6 Drawing Sheets

METHOD FOR CHARACTERIZING A DOCUMENT SET USING EVALUATION SURROGATES

RELATED PATENT APPLICATIONS

This patent application is related to U.S. patent application No. 08/773,194, entitled Mechanism For Recognizing Compound Terms In A Document, assigned to the same assignee and filed on even date herewith. This invention is also related to U.S. patent application No. 08/774,467 entitled Method For Measuring The Thresholded Relevance Of A Document To A Defined Topic, assigned to the same assignee and filed on even date herewith.

BACKGROUND OF THE INVENTION

Technical Field

This invention relates to the field of information retrieval and in particular to methods for evaluating a document set to determine the relevance of the documents to selected topics.

Background Art

Modern computer technology allows databases to incorporate ever greater amounts of information. In order to take full advantage of these advances, methods must be developed to identify, retrieve, and order information in a database that is relevant to selected subjects. Effective information retrieval (IR) requires that the information be represented in a manner that facilitates searching. It also requires means for specifying the search criteria and for analyzing documents that meet the search criteria.

The conventional IR paradigm for text based documents relies on relatively static, information-rich representations of document sets that are suitable for searches on a wide range of subjects. In this paradigm, text based documents are represented by an index file that is derived from the terms of the documents through tokenization, stopping, stemming, and inversion steps. The resulting file is structured so that each term derived from the document set serves as an index to the documents in which it appears.

In addition to identifying and preserving selected document terms for the index, it is also valuable to preserve information that locates these terms within the documents of the set. This allows searchers to specify adjacency criteria to identify documents that include instances of two or more terms in adjacent locations, in the same sentence, in the same paragraph, or within a specified number of words of each other. An index that includes location information for each term is referred to as a full text index (FTIs).

Indexing methods are computationally intensive because of the amount of information that must be identified and correlated for document sets of even modest size. For example, the index for a document set may be 50–300% as large as the document set itself. Generation and maintenance of an index typically requires dedicated computers that have substantial processing and storage capacities. Consequently, indexed document sets are typically available only through services, such as Lexis/Nexis and Dialog, and the available indexes are limited to those document sets for which the costs can be justified.

Conventional indexing methods have limitations in addition to their requirements for processor and memory capacity. For example, FTI methods typically eliminate punctuation, number (plurals), capitalization, and other term data that might be useful in characterizing the contents of the document set. The elimination of potentially valuable search information from index terms is justified by the need to put index terms in a form that is sufficiently generic to support searches on a wide variety of subjects. It also limits the storage overhead associated with retaining detailed information in the index file.

A more recent document browsing paradigm involves explicitly linked, hypertext documents, such as those available through the World Wide Web. In this case, browsing is determined by the embedded links between documents, and these links are determined by the document designers, not the user. Thus, users must navigate through the linked documents to get an overview of their subject matter. Indexed based searching is also available for hypertext document sets through, for example, Alta Vista and InfoSearch. These methods typically operate on the visible text of the documents or web pages using the FTI methods described above and are subject to the same limitations.

Even where an FTI exists for a document set or the documents are hyperlinked, neither searching paradigm provides a convenient way to gain an overview of contents of the set. The output of conventional index-based search methods is typically a list of documents that meet the search criteria, i.e. documents that contain keywords specified in the query or have a statistical correlation with the query that meets a specified threshold. Some search methods provide an ordering of the documents that attempts to reflect their relevance to the search criteria. However, this ordering is done on a query by query basis, without reference to an external standard and without means for coordinating results from different queries.

In sum, there is no generally applicable method available for efficiently searching or browsing document sets. There is similarly no generally applicable method for analyzing the relevance of the documents identified in a search to an externally established standard.

SUMMARY OF THE INVENTION

The present invention is a method for analyzing the relevance of a document to selected topics without resort to indexing procedures or navigation through hypertext links. The selected topics are represented by topic profiles, each of which includes one or more compound term templates that specify the precise forms of terms characteristic of the associated topic. The document is represented as a stream of tokens or document terms.

In accordance with the present invention, the topic profiles are applied to the token stream to identify compound terms in the document, and the token stream is augmented by a a compound term token for each compound term identified. The augmented stream of tokens is reduced by eliminating tokens representing common terms, redundant tokens that correspond to repeated instances of a term, and selected tokens representing components of compound terms, to provide a compact representation of the documents. A similarity function is calculated between the compact document representation eand the topic profiles to provide a measure of relevance of the document to each topic profile. The relevance measures for the document are collected in an evaluation surrogate data structure.

An evaluation surrogate for a set of topic profiles provides a concise summary of the relevance of a document to the topics represented by the topic profiles. In one embodiment of the invention, evaluation surrogates are calculated for a set of documents, and each document is represented as point in a topic space defined by the corresponding topic profiles. Documents relevant to a subject defined by one or more topic profiles are identified visually, according to their location in the topic space.

BRIEF DESCRIPTION OF THE DRAWINGS

The invention may best be understood with reference to the following detailed description and accompanying drawings.

DETAILED DESCRIPTION OF THE INVENTION

Figure 1:
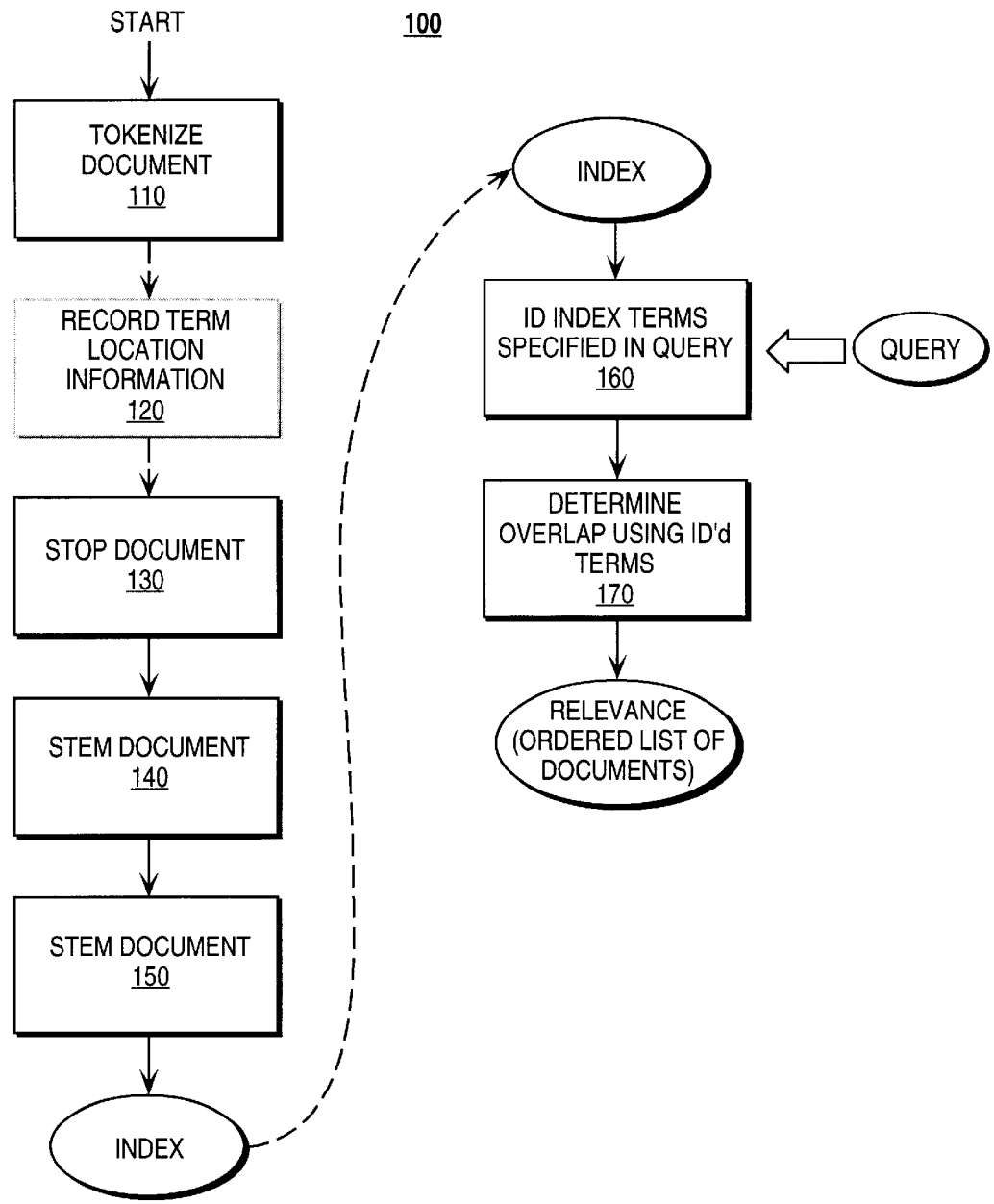
FIG. 1 is a flowchart showing an overview of conventional methods for indexing a documents set.

The present invention provides a method for evaluating the relevance of documents to a given subject without resort to full-text indexing schemes or navigation of hypertext document sets. The method is computationally efficient and may be readily implemented on personal computers and comparable processor-based devices. It is applicable to electronic copies of linear text format document sets, as well as to hypertext document sets such as those available on the World Wide Web.

The present invention combines a compact document representation scheme with a flexible, topic query format to provide a concise evaluation of the relevance of a document to selected topics. The topic query format allows a token representation of a document, including adjacency information, to be generated prior to the loss of potentially valuable information through term elimination (stopping) and truncation (stemming). For this purpose, a topic query is employed to both reduce a document to its compact representation and to analyze the resulting document representation for relevance to the topic(s) specified in the topic query. In particular, selected information regarding capitalization, term adjacency, and alternative forms for selected terms (hereafter, compound terms) is specified in the topic query format and applied to each document to be analyzed prior to stopping and stemming steps that typically eliminate this information. The resulting document representation includes term content information and selected term location information for each document of the set without resort to full-text indexing. In addition, document summary information may be included in the representation.

The topic profiles provide a succinct, externally-defined summary of the topics for which the document(s) is to be evaluated. Topic profiles incorporate the compound terms described above, as well as single terms, each of which are selected to characterize the topic. Both types of terms may be weighted and tagged to implement alternative relevance evaluation schemes.

As noted above, each topic profile in a topic query is applied to the document(s) twice. The first application uses specified compound terms to retain selected adjacency information in the reduced representation of the document(s). In one embodiment of the invention, the first instance of each term and its location in the document are retained in the document representation, and only the number of subsequent instances of the term is tracked. This further reduces the size of the representation.

The second application of the topic profiles determines a measure of relevance for each document to each topic represented by a profile. This is accomplished by calculating a similarity function between the each document representation and each topic profile. The resulting measures of relevance for each document to the topic profiles of the topic query are collected in an evaluation surrogate.

The similarity calculation used to determine the entries of an evaluation surrogate provides a thresholded measure of relevance of the document to each topic profile. The relevance measures for each document can be binary-filtered and plotted in a topic space to facilitate visual analysis of the search results. In sum, an evaluation surrogate provide concise assessment of the relevance of its associated document to the topics specified in the topic profiles. When coupled with powerful graphics analysis methods available on personal computers, evaluation surrogates allow users greater flexibility in analyzing a document set.

In order to appreciate the advantages of the present invention, it is useful to understand conventional full text index-based methods for reducing and analyzing documents using keyword-based queries.

Referring first to FIG. 1, there is shown a flowchart of a conventional document indexing and analysis scheme 100. Initially, a selected document set is tokenized 110 into a stream of tokens which represent the terms of the document. As used with reference to FIG. 1, "terms" includes the words and numbers that make up a document, and "tokens" are compact representations of these terms. In some cases, the tokens may be identical with the terms.

In addition to tokenizing 110 a document, method 100 tracks 120 term location information to facilitate searches for compound terms and query terms related by adjacency restrictions, i.e. Term A within five words of Term B. Location information may be in the form a page number, paragraph number, sentence number and word number that specify the position of each instance of the term within a document. Tracking this information for even a subset of the document terms consumes substantial data storage space and is responsible in part for the size of the full text index representing the document set.

At stopping step 130, method 100 eliminates from the document representation words such as "a", "the", "of", "about" and the like, which are too common to be used effectively in keyword-based searches. Selected terms remaining in the index are then stemmed 130 or truncated to eliminate word endings such as "ing", "ation", plurals, and the like. Conventional method 100 may employ additional steps (not shown) to expand the scope of terms within the document by adding synonymous terms, such as those found in a thesaurus.

Index terms are identified for each document of the set by steps 110–140. An index file is then generated by inverting 150 the collection of document index terms so that each index term points to each document in which it appears.

Associated with the document entries is the location information that specified each location in the document at which the index term appear. Inverting step 150 is both processor and memory-intensive. Steps 110–150 are all implemented independently of the query and its component keywords.

The end result of steps 110–150 is a full text index that represents the information in a set of documents in a format that is relatively easy to search. Given the fact that a typical 8.5×11 sheet of paper includes approximately 200–250 words, it is apparent that the number of terms to be analyzed in even a small document set imposes substantial data processing and storage requirements on index generating and maintenance systems.

Also indicated in FIG. 1 are query analysis steps 160, 170. A user specifies a query 162 that includes keywords characteristic of the subject matter of interest. Typical queries 162 will include compound terms and phrases in which keywords are specified with adjacency restrictions. The query is compared 160 against the index to identify any keywords in the index and the documents that include these keywords. In addition, compound terms and phrases specified in a query will be checked against corresponding terms and location data in the index to determine whether the adjacency restrictions are met. This analysis requires the full text index and is only implemented after stopping and stemming 130, 140, respectively, when key information may already be eliminated. There is no attempt to correlate compound terms in the query with word groups in the document representation prior to indexing.

Some analysis methods 100 simply identify the documents that contain the specified keywords and allow the user to review the identified documents to determine their relevance. Other methods determine a measure of relevance by calculating a similarity function between the query and each document identified as containing the specified keywords. These methods may also order the documents according to the extent of their correlation with a search query or with a model document. Methods for generating FTIs and evaluating document relevance are discussed, for example, in Salton, *Automatic Text Processing*, Addison-Wesley, Reading, Mass., (1989) and in Salton & McGill, Introduction to Modem Information Retrieval, McGraw-Hill, N.Y. (1983).

Figure 2:
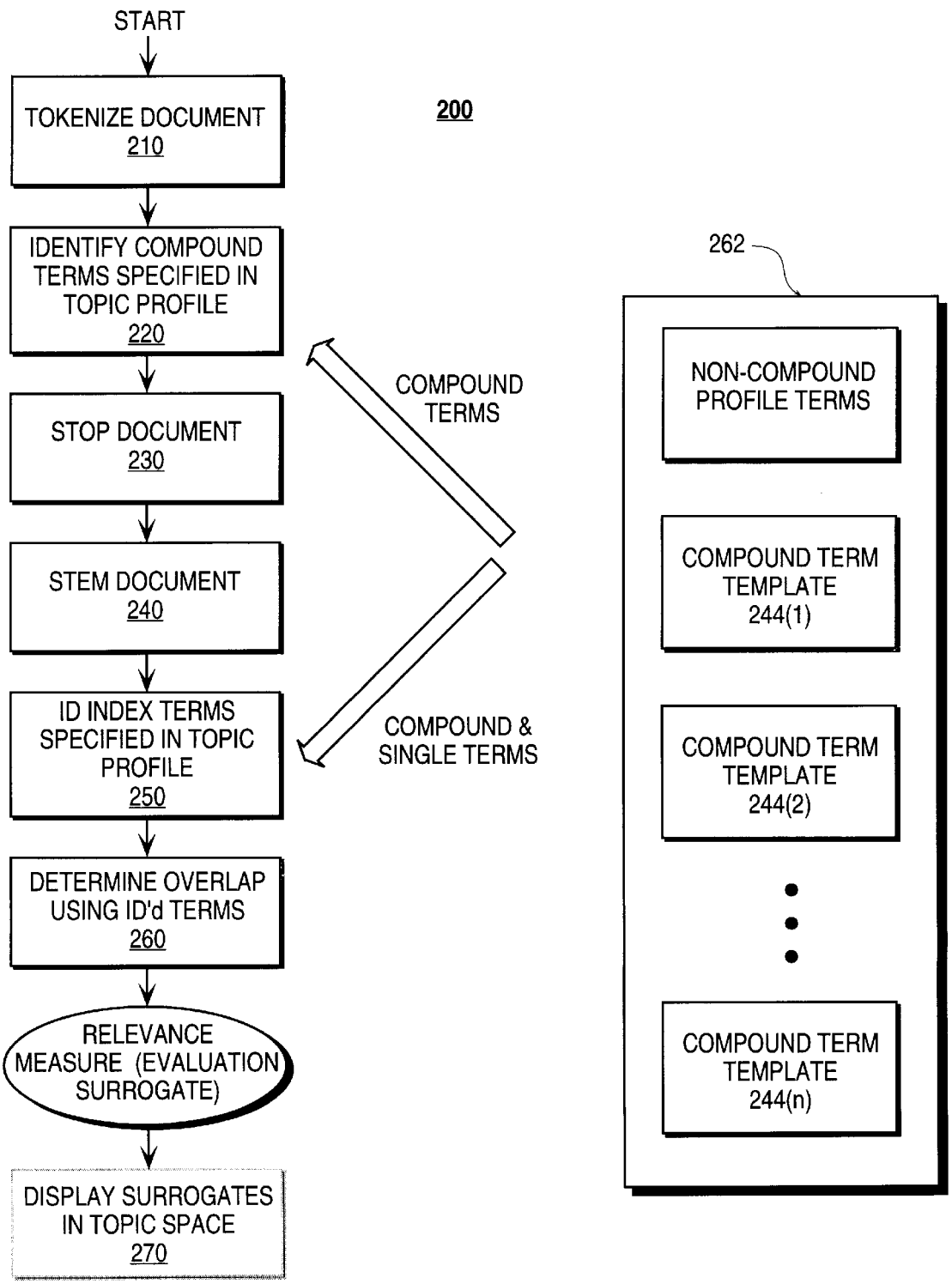
FIG. 2 is a flowchart of a method in accordance with the present invention for evaluating the relevance of a set of documents to selected topics.

Referring now to FIG. 2, there is shown a flow chart indicating a method 200 for document reduction and analysis in accordance with the present invention. As indicated in the figure, topic profile(s) 262 are applied in both the document reduction and analysis portions of method 200.

Initially, each document to be analyzed is tokenized 210 into a stream of document tokens representing the terms of the document. With reference to FIG. 2, "terms" means the words, numbers, punctuation marks, and symbols that make up the text of the document. Conventional methods typically tokenize only words and numbers, due to the high processing and storage overhead associated with indexing retained terms. The present invention retains this additional information at least through step 220, in order to provide a more accurate representation of the documents.

Following tokenization 210, the stream of document tokens is scanned to identify 220 any compound terms specified in topic profiles 262. As used in this discussion, compound terms refers to single terms with specified capitalizations, punctuations, plurality, and the like, as well as groups of two or more adjacent, single terms, having a specified form, and their equivalents. A token representing a compound term is added to the document stream when the component terms are identified in the stream.

By identifying compound terms prior to stopping 230 and stemming 240, method 200 allows adjacency information to be incorporated into the document representation without recording explicit location information, as is conventionally done. In addition, due to the more complete set of document terms tokenized at step 210, greater specificity may be exercised in identifying compound terms and their alternative forms. For this purpose, topic profiles 262 include data structures to serve as templates for the compound terms. These data structures include tags for specifying how identified compound terms and their component terms will be treated in stopping step 230, and are discussed below in conjunction with FIG. 3.

At stopping step 230, method 200 eliminates tokens from the document representation that are too common to be useful for searching purposes. Significantly, by implementing compound term identification 220 prior to stopping 230, method 200 allows compound terms to include common terms that would otherwise be stopped 230. In addition to eliminating common terms, stopping step 230 may also eliminate tokens representing the component terms of a compound termaccording to tags provided at step 220. Options include eliminating or retaining a compound term token or tokens corresponding to any component term of the compound term. This feature is particularly useful for identifying instances of a profile term that alias a different subject area.

Stopping step 230 may also eliminate redundant tokens representing subsequent instances of a retained term. Again, since compound term identification occurs earlier in process 200, redundant terms need not be retained for subsequent adjacency or compound term analyses. However, selected term information useful for assessing the significance of the term in the document may be retained at stopping step 230. For example, the relative location of the first instance of a term in the document and the number of times a term appears in a document often correlate with the significance of the term to the subject matter of the document. Generally, a term that deals with a major concept in a document is more likely to appear early and often in the document. This information may be determined and retained in the reduced representation of a document for negligible additional cost in processing power and storage capacity.

As noted in conjunction with FIG. 1, stemming 240 eliminates standard suffixes from words so they may be searched by their root words. This allows a query to include a reference to the root rather than separately identifying each form of a word based on the root. Stemming 240 is optional but is typically included to support more concise topic profiles. Compound terms are not stemmed.

Following stemming 240, the document is in a compact representation suitable for searching. The size of the representation is greatly reduced relative to that of a full text index through a combination of features. Compound term identification allows the retention of highly specific term information in the representation, including adjacency information, without use of term location information. Incorporating adjacency information in compound terms, allows redundant instances of terms to be eliminated in stopping step 230, and the retention of detailed term information, i.e. capitalization, number, punctuation and the like, supports the use of very precise search terms. By preserving this information in precisely the terms that will be used for searching, the present invention eliminates the need for much of the incidental information that is preserved in a FTI methods to reconstruct document structures.

Relevance analysis is performed on the compact representation of the document set, further reducing the memory and processing capabilities necessary to implement the present invention. Accordingly, topic profiles 262 are compared 260 with the reduced representation to identify any topic profile terms present in the representation. The compact representation speeds the identification of the terms of topic profile(s) 262 present in the document set representation without use of a separate index file. In a preferred embodiment of the invention, topic profile terms are represented by entries in a hash table. Profile terms in a document are identified by applying a hashing function to each term of the document representation and comparing the label at the resulting hash table entry with the document term. A match indicates that the document includes the topic profile term.

Once the profile terms present in the representation(s) have been identified, a similarity function between the topic profile(s) and identified terms is calculated 270. In one embodiment of method 200, the similarity function is given by formula (I):

$$SIM(DOC_i, PROFILE) = N \cdot \sum_{k=1}^{n} DTERM_{ik} \cdot PTERM_k$$

Here, $DTERM_{ik}$ indicates whether the $k^{th}$ term of the profile is present in the $i^{th}$ document of the document set ($Doc_i$), $PTERM_k$ is a weight associated with the $k^{th}$ term of the profile, Profile is a collection of PTERMs specified in topic profile(s) 262, and N is a normalization constant. The output of method 200 is an evaluation surrogate for each document being evaluated with topic profile(s) 262.

Figure 3:
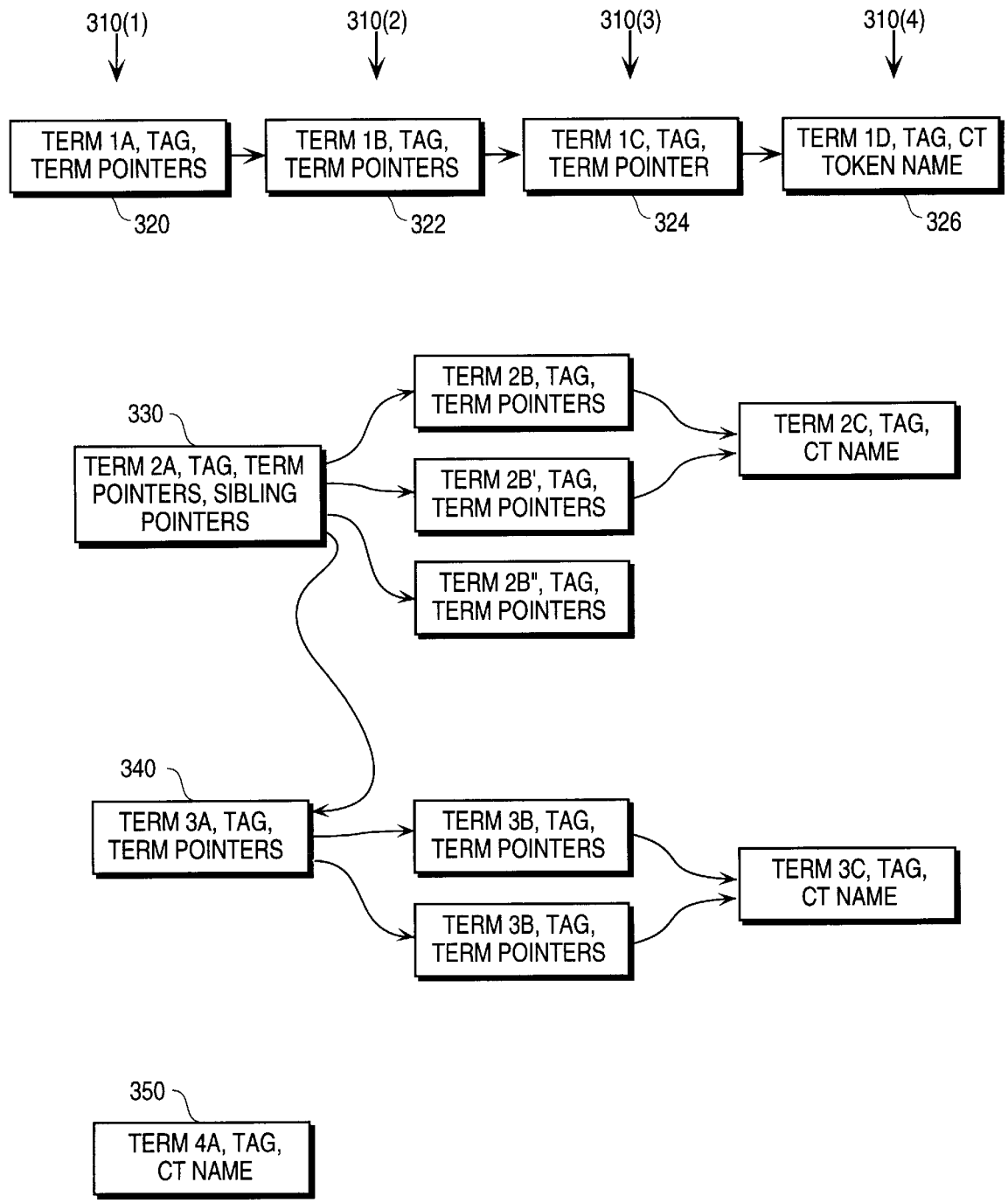
FIG. 3 is a block diagram of a compound term template for use in generating evaluation surrogates in accordance with the present invention.

Referring now to FIG. 3, there is shown one embodiment of a topic profile 262 including compound term templates 244(1), 244(2), 244(3), 244(4) for recognizing compound terms in a document. In the embodiment of FIG. 3, compound term templates 244 are implemented by a series of hash tables 310(1), 310(2), 310(3) . . . 310(p). All entries in hash table 310(1) correspond to initial terms of one of the compound terms represented by compound term templates 240. Similarly, all entries of hash table 310(2) correspond to second component terms of one of the compound terms represented by templates 240.

Referring first to entry 320, term 1A is a label, e.g. character string, corresponding to the initial term of a compound term represented by compound term template 240(1). A tag in entry 320 specifies how term 1A is to be treated in a subsequent stopping step 240 (FIG. 1), and a pointer indicates the location in hash table 310(2) of the entry (1B) that follows term 1A in the compound term. Entries 322, 324 for terms 1B and 1C include similar information. Entry 326, which corresponds to the last component term in compound term template 244(1) includes a label for the term, a tag, and a label indicating the canonical name of the compound term, i.e. the token name.

Intermediate terms may also include a canonical name for the compound term, where a subset of the component terms may indicate the same compound term as the full set of component terms. For example, consider the case where compound term template 244(1) is designed to pick out references to the "Federal Bureau of Investigation" in a document. In this example, terms 1A, 1B, 1C, and 1D correspond to "Federal", "Bureau", "of", and "Investigation", respectively. A document might initially use the full name of the organization and subsequently identify it as the "Federal Bureau". For these latter instances of the term, template 244(1) should be able to terminate at term 1 B and generate the same canonical compound term name as when the stream of document terms includes the full title. In general, any term of a compound term template 244(j) which may terminate an alternative representation of the compound term should include the canonical compound term name in addition to a pointer to the subsequent terms of the full compound term name. Where the subsequent term of the stream of document terms fails to match the label of the subsequent entry, the shortened form of the compound term can still be identified using the shortened form.

The comparison between the term stream and template continues as long as document terms in the stream match the corresponding labels in an accessed compound term template. The comparison ceases when a document term from the stream fails to match the next term in the compound term template or a last term in the template is reached. In the first case, the template is closed, and in the second case, a compound term token is added to the document stream with a tag specified by the corresponding template. Entries 330 and 340 represent the initial terms for a compound term template 244(2) that includes an alternative form (template 244(3)) of the compound term. In this case, entry 330 includes pointers to more than one second term (terms 2B and 2B') in the compound term, as well as a pointer to a sibling first term (term 3A) having its own second terms 3B, 3B' and third term 3C. One use for such coupled templates arises where different capitalizations of a compound term are considered acceptable for identification purposes. For example, the compound terms, "savings and loan", "Savings and Loan", Savings And Loan", "Savings & Loan", and "savings & loan" may be used in different documents relating to the banking industry. In order to identify a document using any of these references, methods that rely on exact string matching must identify each reference separately in a query. As noted above, FTI methods typically ignore capitalization altogether, losing potentially valuable information and eliminating any ability to discriminate between different capitalizations of compound terms.

Figure 4A:
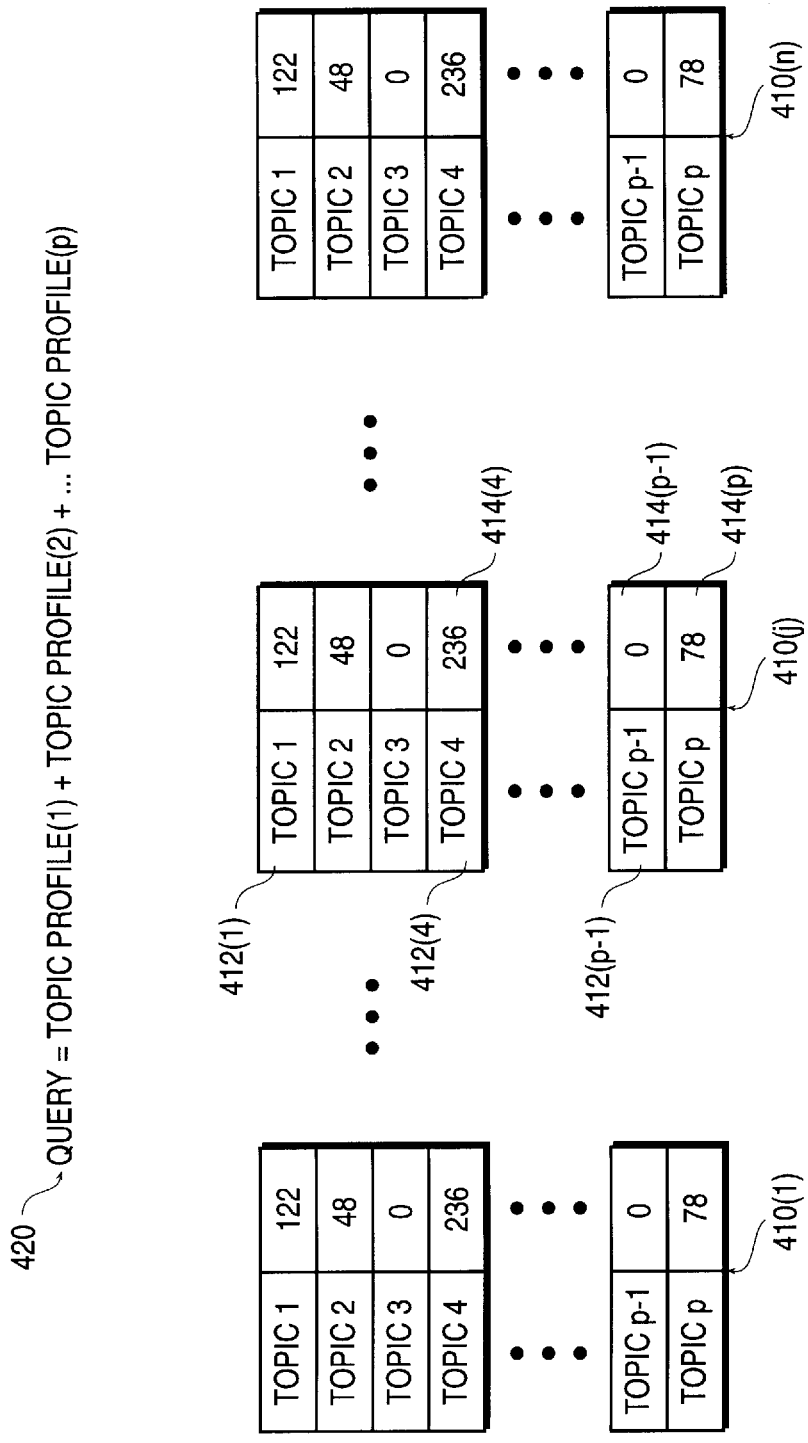
FIG. 4A is a block level diagram indicating the relationship between a topic query comprising multiple topic profiles and the evaluation surrogates generated by applying the topic query to a document set in accordance with the method of FIG. 2.

Referring now to FIG. 4A, there is shown a block representation of evaluation surrogates 410(1)–310(n) generated by applying a topic query 420 to documents 430(1)–430(n) in accordance with method 200. Topic query 420 is shown comprising p-topic profiles 262, the structure of which is discussed below. For this discussion, references to a collection of documents 430, evaluation surrogates 410, or topic profiles 262 are not indexed, while an index j is used to indicate a representative document 430(j), evaluation surrogate 410(j), or topic profile 262(j). Accordingly, evaluation surrogate 410(j) includes entries 412(1)-412(p), one for each of p-topic profiles 262. For example, associated with entry 412(l) is a numerical indication 414(l) of the relevance of document 4300) to topic profile 462(l), where indication 414(l) is determined by Equation I or a comparable measure of relevance. In the disclosed embodiment, indications 414 are normalized to between 0 and 255. The threshold level of indications 414, above which a document is deemed relevant to the corresponding topic, may be selected independently for each topic. Alternatively, thresholds for all topic profiles 262 may be set to a common level, such as zero. In this case, any document having a non-zero similarity function with a topic profile will be deemed relevant to the topic.

In a preferred embodiment of the invention, terms for each topic profile are selected based on the strength and exclusivity of their correlation with the topic. Ideally, profile terms are sufficiently narrow, i.e. peculiar to the topic, that most documents will not meet the associated threshold measures of relevance, i.e. most documents should not be about most topics. As discussed above, the present invention supports precisely defined search terms by retaining more detailed term information in the document representation. The result is an evaluation surrogate that has non-zero entries for only a few topics profiles.

Figure 4B:
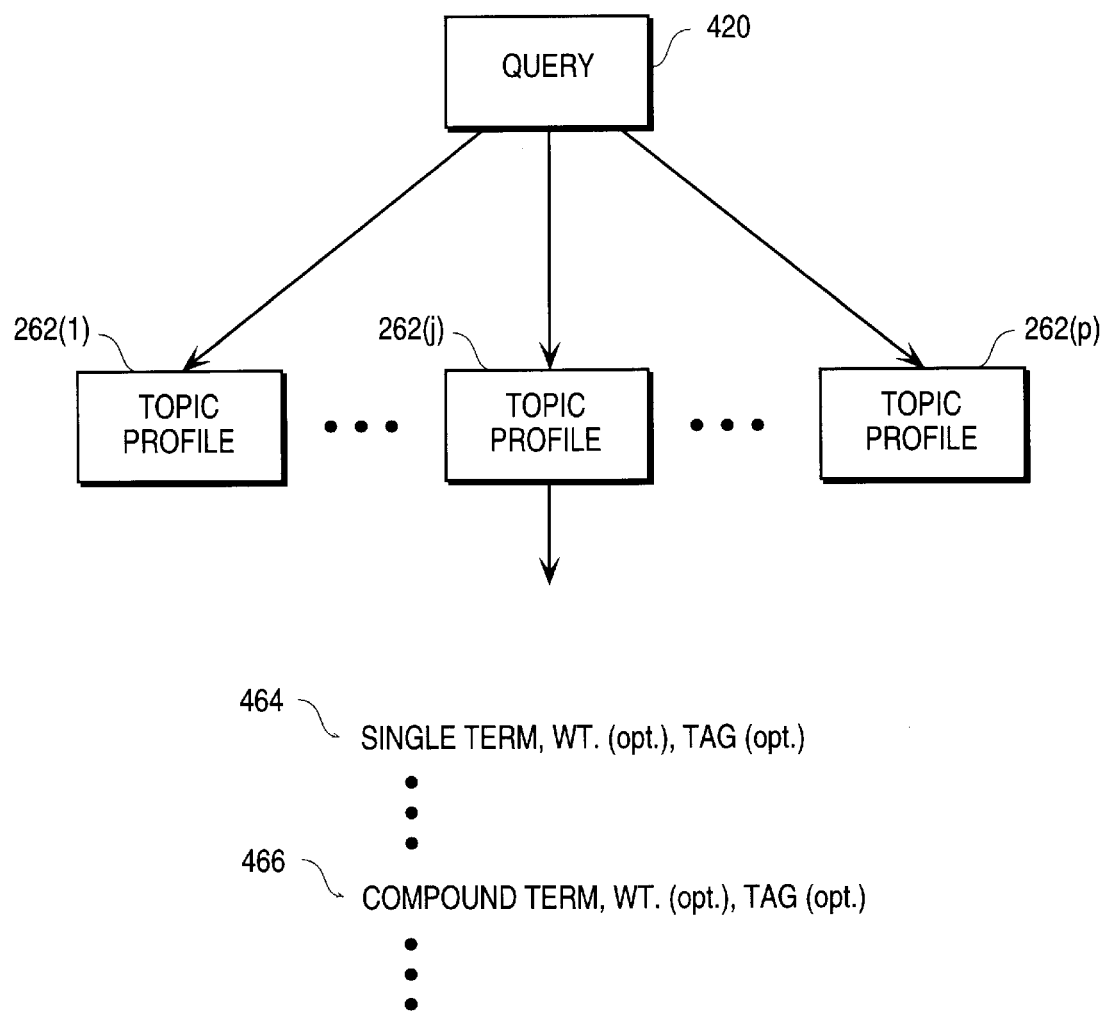
FIG. 4B is a block diagram indicating the hierarchical structure of the topic query of FIG. 4A.

Referring now to FIG. 4B, there is shown a block level diagram of topic query 420 and its component topic profiles 263(1)–262(p). While topic query 420 is shown comprising multiple topic profiles 262, topic queries may also consist of only a single topic profile. As indicated in the figure, topic profile 262(j), comprises single terms 464, each of which may have an associated weight and tag. In one embodiment of method 200, two weights are associated with each term. One weight is used in equation (I) to determine whether a document meets the threshold level of relevance, and the second weight is used to determine a measure of relevance for a document that has been determined to meet the threshold. In this embodiment, pairs of weights are determined for each term within the topic profile, and the weights may be the same or different as appropriate for each term.

Selected profile terms may also have associated tags to indicate non-standard treatment of the term. For example, one tag may be used to indicate that the significance of the associated term is to be evaluated without resort to Equation I, e.g. any document including the term is deemed relevant to the topic.

Topic profile 262(j) also includes compound terms 466 selected to characterize the associated topic. As indicated above, the use of compound terms 466 in method 200 allows a compact document representation that incorporates location information for selected terms, i.e. those specified by compound terms 466 in a topic profile 262. Each compound term in a topic profile has an associated data structure that serves as a template against which terms in the document stream are compared. The data structures also include tags for each component term of a compound term and for the compound term itself. The tags are associated with the compound term token when the corresponding component terms are identified in the document stream. Tags indicate whether the compound term token or the tokens associated with the component terms should be eliminated from the document representation at stopping step 230 (FIG. 2).

Where a topic query includes multiple topic profiles, care must be taken to ensure that there are no conflicts between the treatment of compound terms in one topic profile and the search terms used in a different profile. For example, if profile term in one topic profile is also a component term of a compound term that is tagged "exclusive" in a different topic profile, stopping 230 will exclude instances of the component term from the document set representation. Such conflicts can be avoided by careful selection of compound and single terms for the different topic profiles.

Figure 5:
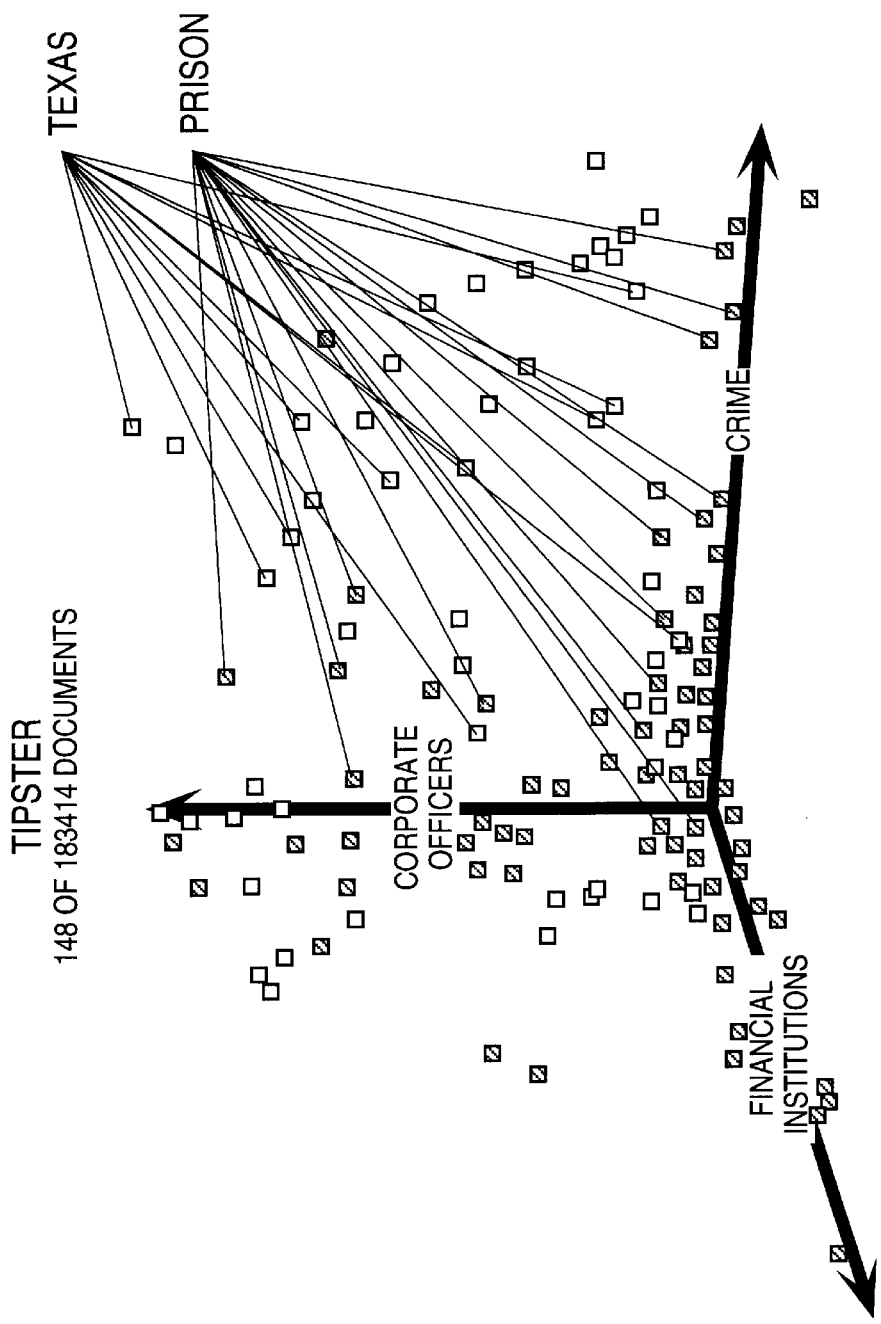
FIG. 5 is a graphical presentation of the evaluation surrogates determined for a document set from a topic query comprising three topic profiles.

Referring now to FIG. 5, there is shown a perspective view of a plot of evaluation surrogates 410 for a topic query comprising three different topic profiles. Each point in the three-dimensional plot represent the relevance indications 414 of a document to each of three topics, indicated along the coordinate axes. In the disclosed example, the topics are "Financial Institutions", "Corporate Officers", and "(Financial) Crime". The topic query comprising these topic profile was designed to identify documents relevant to white collar crime in financial institutions in the TIPSTER document collection, Donna Harmon & Mark Lieberman, ARPA TIPSTER Information Retrieval, Text Research Collection, Vol. 1. The topic profiles for the topic query of FIG. 4 are summarized in Tables 1, 2, and 3.

TABLE 1

FINANCIAL INSTITUTIONS

| Profile Terms | Canonical Name (Token) | Weight | Tag |
|---|---|---|---|
| mortgage | mortgage | 0/60 | — |
| "Bank" | Bank | 180 | — |
| "s&l" | s&l | 150 | — |
| "savings & loan" | | | |
| "Savings & Loan" | | | |
| "savings and loan" | | | |
| "Savings and Loan" | | | |
| "Thrift" | | | |
| "the thrift" | | | |
| "thrifts" | | | |
| "credit union" | credit union | 80 | — |
| "West Bank" | West Bank | 0/0 | % |
| "Left Bank" | Left Bank | 0/0 | % |

TABLE 2

FINANCIAL CRIME

| Single Terms | Weight | Tag | Compound Terms | Weight | Tag |
|---|---|---|---|---|---|
| conspiracy | 10/100 | — | years in prison | — | — |
| falsify | 10/100 | — | seized by federal | — | — |
| fraud | 10/100 | — | tax-shelter | — | — |
| embezzle | — | G | inflated the value | — | — |
| racketeering | — | — | federal grand jury | — | — |
| | | | thrift-fraud | — | — |
| | | | fraudulent sale | — | — |
| | | | insider trading | — | G |
| | | | insider dealing | — | — |
| | | | seized by regulators | — | — |
| | | | securities fraud | — | G |
| | | | securities and *fraud | — | * |
| | | | Illicit use of | — | — |
| | | | false entries | — | — |
| | | | misapplication of funds | — | — |
| | | | conspired to defraud | — | — |
| | | | lending practices | — | — |
| | | | stealing millions | — | — |

TABLE 3

CORPORATE OFFICERS

| Single Terms | Weight | Tag | Compound Terms | Weight | Tag |
|---|---|---|---|---|---|
| president | — | — | vice president | — | — |
| vice-president | — | — | directors of | — | — |
| ex-president | — | — | top executives | — | — |
| chairman | — | — | owner of | — | — |
| executives | — | — | chief executive officer | — | — |
| | | | chief operating officer | — | — |
| | | | its officers | — | — |
| | | | officer of | — | — |
| | | | financier | — | — |

The profile terms for a Financial Institutions topic profile are listed in Table 1. Note that all profile terms that specify capitalization (Bank), include non-alphanumeric characters (s&l), or include multiple terms (credit union, West Bank, Left Bank) are compound terms. Because compound terms are identified early in the document representation process, i.e. before stopping, stemming, elimination of character cases and non-alphanumeric characters, they may be defined with greater specificity than single terms, which are identified later in process 200. This specificity reduces aliasing, i.e. documents including references to river banks or banked turns will not be identified because of the profile term Bank.

This limits the number of documents that are incorrectly identified by the search. The various terms used to refer to savings and loans, i.e. s&l, savings & loan, Thrift, etc. are assigned a single weight and canonical token (s&l) to avoid overcounting references to these entities. The weights shown for the profile terms indicate their relative significance to the topic being profiled and are used to calculate the relevance measure for each document including the associated profile term. In this embodiment, a default value of 100 is used when no weight is specified. By appropriate scaling of the normalization used in Equation (I), any convenient weighting scheme, e.g. 0–1, 0–25, may be employed.

In the disclosed embodiment, the terms "West Bank" and "Left Bank" are alias terms. That is, despite the presence of the word, "Bank", in documents including these compound terms, the documents are more likely to be relevant to the Middle East and Paris, respectively, than to financial institutions. The % tag indicates that tokens corresponding to the component terms (Left, West, and Bank) should be eliminated from the document representation at stopping step 230 (FIG. 2). On the other hand, a token for "West Bank" or "Left Bank" may be added to the document representation with zero weight. The zero weight indicates that the terms "West Bank" and "Left Bank" should not contribute to the relevance measure for a document that includes them.

In an alternative embodiment of the present invention, alias terms like "West Bank" and "Left Bank" may be defined separately from the topic profile. In a preferred embodiment of the present invention, alias terms for multiple topic profiles are collected on a list separate from their topic profiles, to facilitate checking for conflicts.

Table 2 represents a topic profile developed for a Financial Crimes topic profile. In this case, five single terms are specified. Where a pair of weights is provided for a term, the first is used in calculating a similarity function between a document and a topic profile. If the calculated similarity function meets a threshold level of relevance, the document is deemed relevant and calculation of the similarity function is repeated using the second weight of the pair. Where no weights are indicated, the selection and production weights are taken as being equal to a common default value.

Selected compound terms in Table 2 are tagged with a "G". In this context, "G" stands for "giveaway" to indicate that the presence of the associated term (token) in a document indicates that the document is relevant to the topic specified in the profile. When a token tagged "G" is identified in a document, the document is automatically deemed relevant, without calculating a threshold similarity function.

Table 3 provides a summary of profile terms for a Corporate Officers topic profile. Default weights are used and no tagging is employed, indicating the terms are of comparable relevance to the topic of corporations.

Referring again to FIG. 5, there are shown points in a three dimensional topic space defined by a topic query comprising the topic profiles of Tables 1–3. The topic query was designed to identify the documents in a 183,414 document set that were relevant to the issue of white-collar crime in the savings and loan crisis. The points in the topic space represent the evaluation surrogates for the 148 documents that met the threshold requirements for relevance to the indicated topics (axes).

If each evaluation surrogate is interpreted as the a vector in the topic space of FIG. 5, those surrogates having large components along the "Financial Institutions", "Crime", and Corporate Officers" axes correspond to the documents most likely to be relevant to white-collar crime in the savings and loan crisis. The graphical nature of FIG. 5 makes these documents easy to identify. In a preferred embodiment of the invention, a document corresponding to an evaluation surrogate may be identified by "clicking" on the evaluation surrogate with a mouse or similar input device.

There has thus been presented a method for analyzing the relevance of documents to one or more topic profiles without resort to indexing schemes or navigating through linked, hypertext documents.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

I claim:

1. A method for determining measures of relevance of a document to selected topics, wherein the document is represented as a stream of tokens and the selected topics are represented by topic profiles, each of which includes one or more compound term templates that specify the precise forms of terms characteristic of the topic, the method comprising the steps of:

applying the topic profiles to the token stream to identify compound terms in the document;

augmenting the token stream with a compound term token for each compound term identified;

eliminating from the augmented token stream tokens representing common terms, redundant tokens that correspond to repeated instances of a term, and selected tokens representing components of compound terms to provide a compact representation of the document;

calculating a similarity function between the compact document representation of the document and the topic profiles to form an evaluation surrogate of the document for the topic profiles.

2. The method of claim 1, comprising the additional steps of:

calculating evaluation surrogates for a plurality of documents; and plotting the evaluation surrogates for the documents in a topic space formed by the topic profiles to identify the documents most relevant to the topic profiles.

3. A method for characterizing the relevance of a document, represented as a stream of document terms, to one or more topic profiles, the method comprising the steps of, for each of the one or more topic profiles;

identifying compound terms in the stream using compound term data structures specified in the topic profile;

augmenting the stream of document terms with compound term tokens for compound terms identified in the stream;

stopping the augmented stream of document terms, according to selected criteria;

calculating a similarity function between the document and the topic profile to provide a measure of relevance of the document to the topic profile; and adding the calculated similarity function as an entry in an evaluation surrogate for the document.

4. The method of claim 3, wherein the augmenting step comprises the substeps of;

identifying a retention status tag for each identified compound term in the data structures associated with the identified compound terms;

tagging the compound term token to indicate the retention status; and adding the tagged compound term token to the stream of document terms.

5. The method of claim 4, wherein the stopping step comprises stopping the augmented stream of document terms according to the retention status indicated by the tagged compound term tokens.

6. The method of claim 3, comprising the additional step of repeating the identifying, augmenting, stopping, calculating and adding steps for a plurality of documents.

7. The method of claim 3, comprising the additional step of displaying the entries of the evaluation surrogate of the document in a vector space spanned by axes representing the topic profiles applied to the document.

8. A method for representing a document as an evaluation surrogate indicating relevance measures of the document to each of a plurality of topic profiles, the method comprising the steps of;

tokenizing the document into a stream of document terms;

applying compound term data structures specified in each of the plurality of topic profiles to the document terms to augment the document terms with compound terms identified in the document through the data structures;

stopping the document terms according to the identified compound terms of each topic profile;

calculating a similarity function between the augmented document terms for each topic profile and the topic profile to determine a measure of relevance of the document to the topic profile; and collecting the measures of relevance for each of the plurality of topic profiles into an evaluation surrogate for the document.

9. The method of claim 8, comprising the additional step of repeating the tokenizing, applying, augmenting, calculating, and collecting steps for a set of additional documents.

10. The method of claim 9, comprising the additional step of displaying the evaluation surrogates for each document in a vector space spanned by the topic profiles.

11. A method for determining measures of relevance of a set of documents to a plurality of topics, the method comprising the steps of:

generating a topic profile for each of the selected topics, each of the topic profiles comprising terms, including compound terms, characteristic of the topic;

comparing each of the topic profiles with each of the documents of the set to identify a set of topic profile terms appearing in each document of the set;

calculating a measure of relevance for each document to each of the topic profiles, using the identified set of topic profile terms of each document; and generating an evaluation surrogate for each document, the evaluation surrogate of each document comprising the measures of relevance of the document to each of the topic profiles.

12. A method for identifying one or more documents in a document set that are relevant to a topic query comprising one or more topic profiles, the method comprising the steps of:

tokenizing each of the one or more documents into a stream of document tokens;

identifying compound terms, specified in the one or more topic profiles, in each stream of document tokens, and adding a compound term token to the stream for each compound term identified;

eliminating common, redundant, and selected tokens from each stream to provide a compact representation of each document of the set; and determining a similarity function between each document representation and the one or more topic profiles to determine a measure of relevance of each document to each of the one or more topic profiles.

* * * * *